United States Patent Office 2,922,099
Patented Jan. 19, 1960

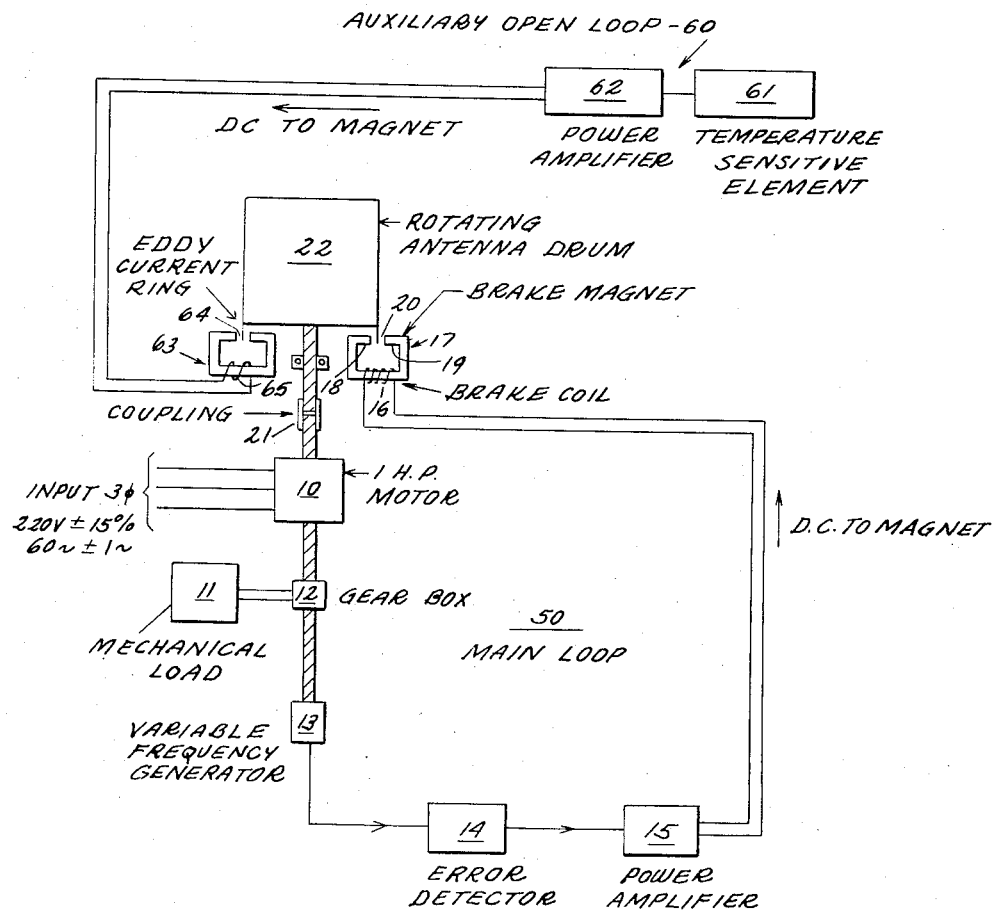

2,922,099

SPEED CONTROL EDDY CURRENT BRAKE

Frank John Gardiner, Bryn Mawr, Pa., assignor to I-T-E Circuit Breaker Company, Philadelphia, Pa., a corporation of Pennsylvania Application May 26, 1958, Serial No. 737,781

3 Claims. (Cl. 318—302)

The instant invention relates to an eddy current brake speed control means whereby the speed of a device is maintained substantially constant even though the voltage of the power source fed to the driving motor may vary plus or minus 15% about a nominal value, the frequency of the source may vary plus or minus 1.67% about a nominal value, and the load imposed on the motor may vary from 1/3 H.P. to 1 1/4 H.P. In many types of motor driven apparatus, such as a navigation antenna system, it is often essential that the speed of the apparatus remain substantially constant even though the frequency and voltage of the source feeding the drive motor and the power required to rotate the antenna may vary within a particular range. Automatic speed control of high slip induction motors in the prior art was often achieved by the use of a magnetic amplifier or other amplifiers. With these arrangements, it was necessary to control the full wattage being fed to the motor. Therefore, a large and expensive amplifier was required.

I propose to maintain the speed of a three phase high slip induction motor to within plus or minus 0.2% while the power required to drive the antenna may vary from 1/3 to 1 1/4 H.P. and the frequency and voltage input to the motor may vary between the limits of 60 cycles per second plus or minus 1 cycle per second and 220 volts plus or minus 15%, respectively. This is accomplished by selecting a motor which will produce the required output power when operating at the worst condition, that is, 59 cycles per second, and —40° C. ambient temperature. Since the power required to drive the antenna in question is to a large extent the result of air friction, the air temperature must be considered. With more favorable conditions at the power source, excess power received at the motor is dissipated by means of an eddy current brake. This brake requires very little power so that the speed control means is greatly reduced in size and cost over the speed control means utilized by prior art devices.

Briefly, the device of my invention comprises a main loop including a control means driven by the motor to produce an output which controls a brake means connected to retard the motor responsive to the output of the control means. The control means comprises a variable frequency generator which is driven by the motor. The output of the generator is fed to an error detector which converts the generator output signals to D.C. signals which are sent through a power amplifier which produces a direct current signal fed through the magnet coil of a brake means so as to control the amplitude of flux generated by the magnet. The control means also includes an eddy current ring fastened to the antenna drum which is mechanically coupled to the output of the motor with the eddy current ring being positioned with respect to the brake magnet so that flux lines generated by the magnet pass through the eddy current ring.

When the motor attempts to gain speed above the speed at its worst condition because of a load reduction or an increase of the source frequency or voltage over that at the worst condition, the frequency of the variable frequency generator will be increased. This results in a higher D.C. current output from the error detector which increases the current through the coil thereby increasing the flux lines generated by the brake magnet. Thus the eddy current ring will have a greater number of lines to cut per rotation thereof so that the eddy currents induced therein will be increased thereby applying a retarding force to the motor so that the speed thereof will be reduced. As the speed of the motor is reduced, so is the magnitude of D.C. current to the coil and the flux generated by the brake magnet so that the magnitude of eddy currents is reduced together with the braking force on the motor.

My device may include, in addition to the main loop hereinbefore noted, an auxiliary open loop which comprises a temperature sensitive element responsive to the air temperature which controls the D.C. output of another power amplifier. This output signal is fed through a second magnet coil of the brake means. As the ambient temperature increases, the air density increases thereby increasing air friction and the load on the motor. Thus the current through the second coil is decreased thereby reducing the flux lines generated by the brake magnet which reduces the braking forces acting on the motor.

The error detector may take the form of a frequency discriminator of the type illustrated and fully described on pages 611–614 of the 4th edition of the Frederick E. Terman book entitled "Electronic and Radio Engineering" published by the McGraw-Hill Book Company, Inc. in 1955. This error detector includes a combined notch filter and phase detector having an output which is a D.C. signal whose magnitude is a function of the deviation of the input signal frequency from the notch frequency, or tuned frequency, of the notch filter. A generator signal of a frequency below the tuned frequency results in a D.C. output of one polarity while a generator signal of a frequency above the tuned frequency results in a D.C. output of opposite polarity.

With the motor operating at a speed such that the generator frequency is equal to the tuned frequency of the notch filter, a predetermined quiescent flux is generated by the brake magnets. This may be due either to the biasing level of the power amplifiers or else the output of the amplifier may be zero and a permanent magnet may be utilized. Thus when the generator frequency is above the notch frequency the D.C. signal attributable thereto will be of a polarity to generate a flux which adds to the quiescent flux. Conversely, the flux attributable to a generator signal frequency below the notch will buck the quiescent flux. Under the most severe operating conditions the outputs of both power amplifiers are of a magnitude and polarity to reduce the flux generated by the brake magnets to substantially zero so that the eddy current ring does not cut through any flux lines and no eddy currents are generated therein. Thus, at this time, the motor is in no way retarded by the eddy current ring.

With this eddy current brake arrangement a 5 watt amplifier will be sufficient to control the speed of a one horse-power motor whereas prior art arrangements required an amplifier in the 1000 watt class to control a motor of the same size.

Accordingly, a primary object of my invention is to provide a novel and extremely accurate speed control means whereby the speed of a motor driven device is maintained substantially constant although the source frequency and voltage as well as the applied load all may vary independently over a substantial range.

Another object is to provide a speed control means for a three phase high slip induction motor which is greatly reduced in size and cost over that of a magnetic amplifier or other types of amplifiers as utilized by the prior art.

Still another object is to provide a speed control means which utilizes an eddy current brake.

A further object is to provide a novel speed control arrangement wherein the speed of a high slip three phase motor is maintained substantially constant at the operating speed under maximum rated load and for the worst specified conditions of input power and under more favorable conditions the excess power will be dissipated in an eddy current brake.

A still further object is to provide a speed control arrangement whereby a controlled D.C. current is passed through the coil of a brake magnet whenever the speed of the controlled motor exceeds a predetermined speed, with the flux generated by the brake magnet being utilized to generate eddy currents in a ring driven by the motor thereby providing a retarding force for the motor.

These as well as other objects of the instant invention shall become readily apparent after reading the following description of the accompanying drawing in which the single figure is a schematic illustration of my novel speed control eddy current brake.

Now referring to the figure, motor 10, whose speed is to be controlled, is a high slip induction type motor with an input power obtained from a three phase source of 220 volts plus or minus 15% at 60 cycles per second plus or minus 1 cycle. Motor 10 drives both antenna drum 22 and variable frequency generator 13 as well as any other mechanical load 11 through gear box 12. The output of variable frequency generator 13 is fed to error detector 14 with the output thereof being fed to power amplifier 15 producing a D.C. current output which is fed through coil 16 wound about brake magnet 17. Magnet 17 is a permanent magnet of C-shape with the ends 18, 19 of the magnet 17 being inwardly turned to form an air gap 20 which will be jumped by the flux generated by the current in coil 16 and the quiescent flux of the permanently magnetized case.

The shaft coupling 21 joins rotating antenna drum 22 to motor 10 with eddy current ring 23 being carried by drum 22. Ring 23 is positioned within gap 20 so that rotation of drum 22 will cause eddy current ring 23 to cut through any magnetic lines of flux which may be present in gap 20.

Variable frequency generator 13 is a typical A.C. generator whose output frequency is proportional to the speed of motor 10 which acts as the prime mover. A permanent magnet A.C. generator which provides 45 sine wave cycles per revolution has been found satisfactory for the instant application.

Error detector 14 comprises a frequency discriminator of the type illustrated in the Frederick E. Terman book hereinbefore mentioned. This discriminator includes a notch filter and phase detector arranged to receive an A.C. signal and produce a D.C. signal whose amplitude is a function of the variation between the tuned frequency of the notch filter and the frequency of the input signal. The polarity of the D.C. signal is dependent upon which side of the notch frequency the input signal falls.

Power amplifier 15 may be one of the many well known types of magnetic amplifiers.

Thus with the motor 10 operating under maximum load condition of frequency and voltage, the output of error detector 14 is of an amplitude and polarity such that the D.C. output current of power amplifier 15 will pass through coil 16 and produce a flux which bucks out substantially all of the quiescent flux of permanent magnet 17. Since there is no flux in gap 20 no eddy currents will be generated in eddy current ring 23 as it rotates through this region and the rotating drum 22 will offer a minimum amount of load to motor 10.

If either the frequency or voltage of the source feeding motor 10 should increase, motor 10 will tend to run at an increased speed. Thus the output of generator 13 will increase in frequency which will cause the error detector 14 to provide a control signal of the correct magnitude and polarity for power amplifier 15 so that a D.C. current output of correct magnitude and polarity will be supplied thereby to coil 16 of brake magnet 20. The flux in gap 20 will now be cut by eddy current ring 23 so as to have eddy current induced therein. The magnitude of eddy currents will increase as the flux in gap 20 increases and also as the speed of rotation of drum 20 increases.

However, the greater the magnitude of the induced eddy currents, the greater will be the braking force applied to motor 10. Thus any tendency of motor 10 to run at a speed greater than that speed with which it runs under maximum load and the worst conditions of frequency and voltage will be accompanied by the generation of a control signal which is effective to control an eddy current brake whose braking force is proportional to the magnitude of current and the speed of rotation of the motor, with the eddy current brake being effective to reduce the speed of the motor to that speed with which the motor will run under the worst conditions of voltage frequency.

Main loop 50 will, acting by itself, be sufficient for most applications to accurately control the speed of a motor. However, where temperature considerations are of major concern an open loop 60 may be operated in conjunction with closed main loop 50.

Open loop 60 comprises a temperature sensitive element 61 which is operatively connected to control a power amplifier 62. The output signal of the amplifier 62 is a D.C. signal whose amplitude and polarity are determined by the temperature to which element 61 is being subjected. Permanent magnet 63 includes a winding 65 through which the D.C. output current of amplifier 62 is passed so as to control the flux in gap 64.

Magnet 63 is positioned so that ring 23, when rotating, will cut the magnetic flux lines in gap 64. This produces eddy currents in ring 23 which provide a braking force on the motor which is a function of temperature. The braking force provided by magnets 17 and 63 combine to achieve precise speed control of motor 10.

Thus, I have provided a novel speed control arrangement, utilizing an eddy current brake, whereby the speed of a synchronous motor may be maintained constant although the input power thereto may vary over a large range of frequency and voltage. My speed control means is much smaller and much less costly than the amplifiers utilized by the prior art to accomplish a similar function.

In the foregoing, I have described my invention only in connection with preferred embodiments thereof. Many variations and modifications of the principles of my invention within the scope of the description herein are obvious. Accordingly, I prefer to be bound not by specific disclosure herein but only by the appending claims.

I claim:

1. A speed control arrangement for a hi-slip motor which is adapted for energization by a source of A.C. power whose frequency and voltage may both vary independently between a high and a low value; said arrangement comprising a closed main loop, an open auxiliary loop, and a brake means; said main loop comprising means for generating an output responsive to the speed of said motor; a temperature sensitive means confined to said auxiliary loop; said auxiliary loop comprising means for generating an output responsive to temperature; said auxiliary loop output being independent of conditions in said main loop; said motor rotating at a first speed when the load applied thereto is at a predetermined maximum and when said voltage and frequency are both at their low values; said brake means being operatively connected between said control means and said motor to apply controlled loading to said motor as a combined function of said outputs thereby maintaining the speed of said motor substantially constant at said first speed for all values of said frequency and said voltage between their said high and said low values and all values of said load between said maximum and a predetermined minimum; said brake means comprising a magnet and a ring driven by said motor and operatively positioned to cut flux lines generated by said magnet to thereby have eddy currents induced therein; each of said outputs comprising D.C. current passed through individual means operatively connected to said magnet to control the number of flux lines generated thereby.

2. A speed control arrangement for a hi-slip motor which is adapted for energization by a source of A.C. power whose frequency and voltage may both vary independently between a high and a low value; said arrangement comprising a closed main loop, an open auxiliary loop, and a brake means; said main loop comprising means for generating an output responsive to the speed of said motor; a temperature sensitive means confined to said auxiliary loop; said auxiliary loop comprising means for generating an output responsive to temperature; said auxiliary loop output being independent of conditions in said main loop; said motor rotating at a first speed when the load applied thereto is at a predetermined maximum and when said voltage and frequency are both at their low values; said brake means being operatively connected between said control means and said motor to apply controlled loading to said motor as a combined function of said outputs thereby maintaining the speed of said motor substantially constant at said first speed for all values of said frequency and said voltage between their said high and said low values and all values of said load between said maximum and a predetermined minimum; said brake means comprising a magnet and a ring driven by said motor and operatively positioned to cut flux lines generated by said magnet to thereby have eddy currents induced therein; each of said outputs comprising D.C. current passed through individual means operatively connected to said magnet to control the number of flux lines generated thereby; said main loop means comprising a variable frequency generator driven by said motor and feeding an error detector; said error detector including a frequency discriminator whose output is a D.C. signal having a magnitude which is a function of the deviation in frequency between the signals of said generator and a notch frequency to which said discriminator is tuned; said D.C. signal having a polarity determined by which side of said notch frequency said signals fall.

3. A speed control arrangement for a hi-slip motor which is adapted for energization by a source of A.C. power whose frequency and voltage may both vary independently between a high and a low value; said arrangement comprising a closed main loop, an open auxiliary loop, and a brake means; said main loop comprising means for generating an output responsive to the speed of said motor; a temperature sensitive means confined to said auxilitry loop; said auxiliary loop comprising means for generating an output responsive to temperature; said auxiliary loop output being independent of conditions in said main loop; said motor rotating at a first speed when the load applied thereto is at a predetermined maximum and when said voltage and frequency are both at their low values; said brake means being operatively connected between said control means and said motor to apply controlled loading to said motor as a combined function of said outputs thereby maintaining the speed of said motor substantially constant at said first speed for all values of said frequency and said voltage between their said high and said low values and all values of said load between said maximum and a predetermined minimum; said brake means comprising a magnet and a ring driven by said motor and operatively positioned to cut flux lines generated by said magnet to thereby have eddy currents induced therein; each of said outputs comprising D.C. current passed through individual means operatively connected to said magnet to control the number of flux lines generated thereby; said main loop means comprising a variable frequency generator driven by said motor and feeding an error detector; said error detector including a frequency discriminator whose output is a D.C. signal having a magnitude which is a function of the deviation in frequency between the signals of said generator and a notch frequency to which said discriminator is tuned; said D.C. signal having a polarity determined by which side of said notch frequency said signals fall; said auxiliary loop means comprising a temperature responsive means and a power amplifier having a D.C. output which is controlled by said temperature responsive means.

References Cited in the file of this patent

UNITED STATES PATENTS

| | | |
|---|---|---|
| 1,323,761 | Hall | Dec. 2, 1919 |
| 1,749,304 | Scheppman et al. | Mar. 4, 1930 |
| 2,334,510 | Roberts | Nov. 16, 1943 |
| 2,383,360 | Artzt | Aug. 21, 1945 |
| 2,715,202 | Turner et al. | Aug. 9, 1955 |
| 2,766,415 | Schurr | Oct. 9, 1956 |
| 2,767,367 | Black | Oct. 16, 1956 |